United States Patent [19]

Ward

[11] Patent Number: 4,837,469

[45] Date of Patent: Jun. 6, 1989

[54] ELECTRICAL GENERATOR WITH IMPROVED LIQUID COOLING ARRANGEMENT

[75] Inventor: Robert T. Ward, Winter Park, Fla.

[73] Assignee: Westinghouse Electric Corp., Pittsburgh, Pa.

[21] Appl. No.: 144,907

[22] Filed: Jan. 19, 1988

[51] Int. Cl.[4] .............................................. H02K 9/00
[52] U.S. Cl. ........................................ 310/53; 310/54; 310/59; 310/64
[58] Field of Search ................... 310/52, 53, 54, 55, 310/42, 60 R, 58, 59, 64, 65, 254

[56] References Cited

U.S. PATENT DOCUMENTS

| | | | |
|---|---|---|---|
| 2,675,493 | 4/1954 | Grobel | 310/53 |
| 2,683,227 | 7/1954 | Beckwith | 310/64 |
| 2,970,232 | 1/1961 | Kilbourne | 310/53 |
| 3,122,668 | 2/1964 | Cuny | 310/64 |
| 3,822,389 | 7/1976 | Kudlacik | 310/53 |
| 3,968,388 | 7/1976 | Lambrecht | 310/54 |
| 4,029,978 | 6/1977 | Jager | 310/64 |
| 4,140,934 | 2/1979 | Jager | 310/54 |
| 4,172,984 | 10/1979 | Daugherty | 310/65 |

FOREIGN PATENT DOCUMENTS 1156161 10/1963 Fed. Rep. of Germany ........ 310/53
2037794 2/1972 Fed. Rep. of Germany ........ 310/53

OTHER PUBLICATIONS

Westinghouse Publication; PLD 1251-52A; "General Assembly—2-Pole Generator with Water-Cooled Stator".
Westinghouse Publication; PDL 1251-53A; "Stator Coil Cooling Water System".

Primary Examiner—R. Skudy

[57] ABSTRACT

A cooling system for the parallel rings of an electrical generator. The system includes a coolant supply tank, supply and return lines, and a plurality of parallel, tubular liquid cooled conductor rings for conducting current generated in the stator windings of an electrical generator. Each ring has a coolant inlet, a coolant outlet, a central coolant passage and an adjustable flow controller which is selectively positionable so that its end portion lies inside the temperature coolant passage in the parallel rings to restrict the coolant flow for control purposes.

6 Claims, 3 Drawing Sheets

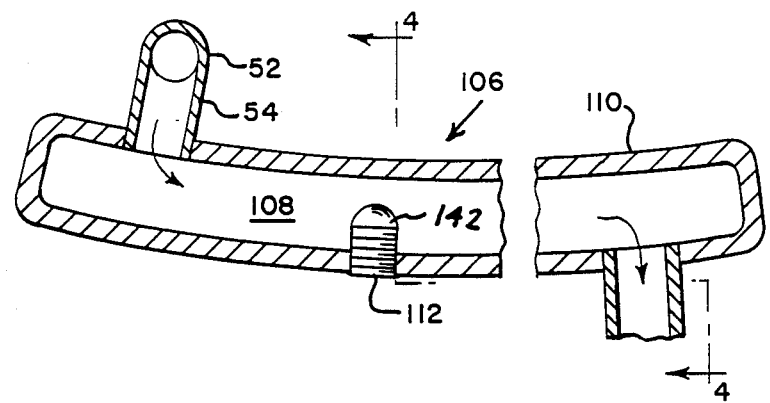
FIG_3_
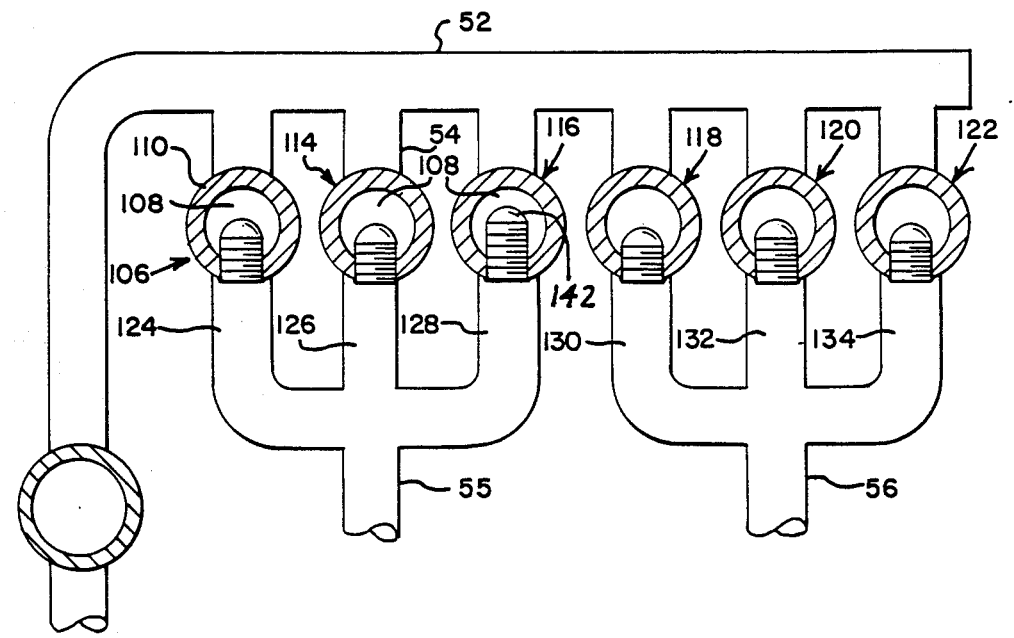
FIG_4_

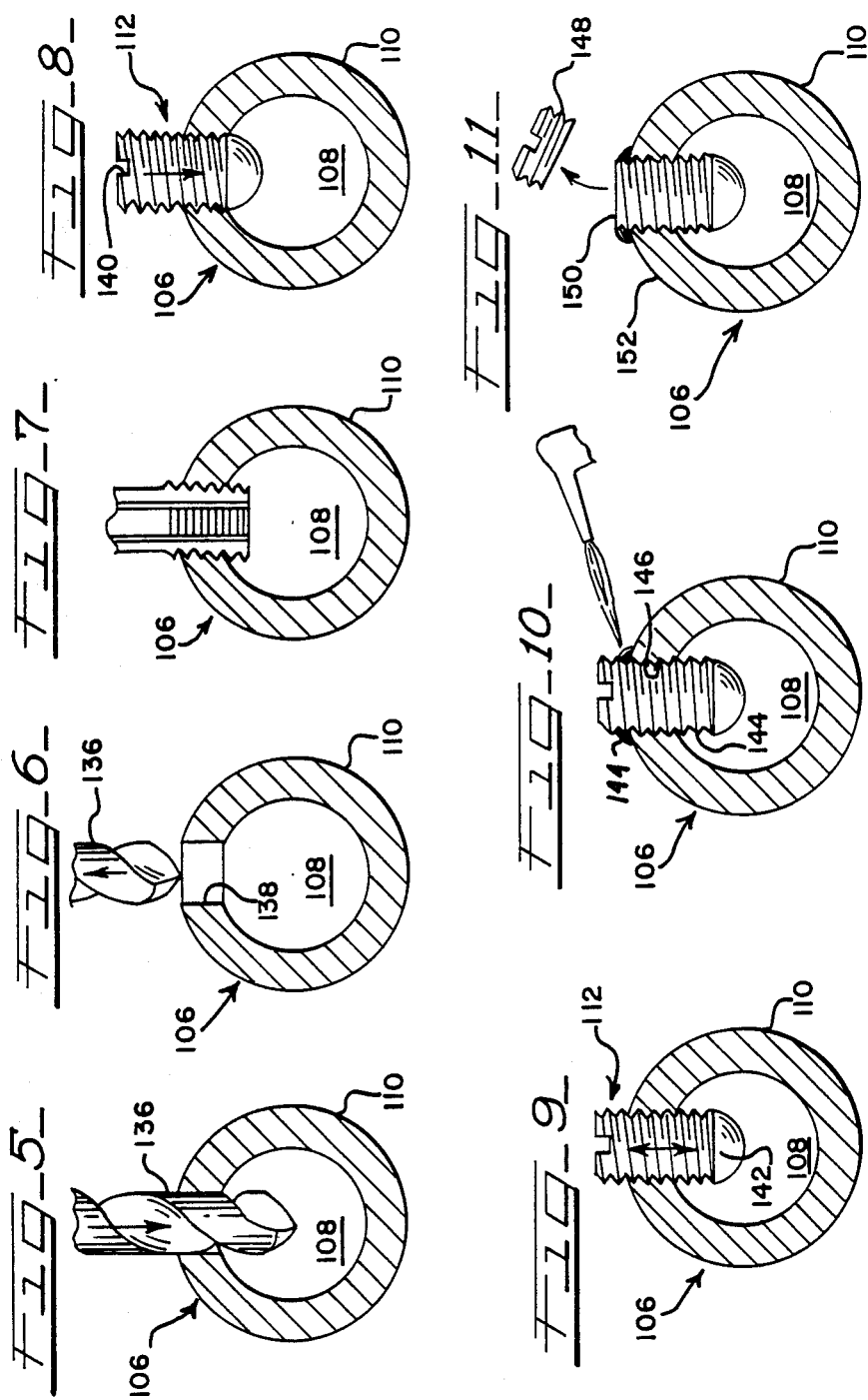

ELECTRICAL GENERATOR WITH IMPROVED LIQUID COOLING ARRANGEMENT

The present invention relates generally to liquid cooling for electrical generators, and more particularly, to an apparatus and method for controlling the flow of liquid coolant within the so-called parallel rings of large electrical generators.

Temperature control is a vital aspect of many important industrial operatitons. In particular, large electrical generators, such as those generating electrical energy for public utilities and the like, are designed for the most efficient generation of electrical energy under a variety of load conditions. As with any mechanical process, heat is a by-product of electrical generation, and where enormous currents are generated for supply to extensive electrical distribution networks, the subject of temperature control is of vital importance. It is now customary for electrical generators to include water cooling circuits which are arranged so as to control the temperature rise of at least some parts of these large generators during operation.

For example, in a typical utility generator driven by a steam turbine and having an external exciter, it is customary for the generator to include a cooling system having supply and collection manifolds which supply liquid coolant for circulation in intimate heat exchange relation with the coils embedded in the stator of the generator. Coolant is circulated from supply tank via appropriate pumps and valves through such cooling circuit; coolant flow may be controlled in response to the temperature of the stator and its surrounding elements. As the load imposed on the generator increases or decreases, counterpart changes in the coolant flow rate are made so that the stator temperature is maintained within allowable limits.

Large electrical also have a requirement for cooling of the so-called parallel rings, that is, large electrically conductive rings typically situated at one of the stator and serving to collect the current from the phase leads or winding ends of the various stator windings. Many large generators include six such parallel rings, arranged in pairs which are connected to respective ends of one electrical phase of the generator; other generators may utilize a different number of rings, depending on the design. Hence, in a typical three phase generator, six windings are arranged such that two are in electrically conductive relation to the various windings constituting one electrical phase, two other rings are associated with the windings of the second phase, and so on. Since these parallel rings collect the current supplied to the lead bushings and ultimately to the distribution network, proper cooling of the parallel rings is critical to continued performance of the generator in a trouble-free manner.

While provision is now customarily for liquid cooling of the parallel rings, usually by withdrawing water from the manifold which directs coolant to the winding in the stator, parallel ring cooling in prior generators has been known to fail, with the result that extreme damage to the genteretor and/or distribution network results. Analysis of one such failure indicated that while perhaps an adequate supply of coolant was availble for cooling the parallel rings, the circulation within each of the individual parallel rings was not adequate, that is, there was improper flow distribution within the individual parallel rings.

At present, it is the practice supply coolant to the parallel rings in a more or less uncontrolled manner by drawing liquid from the manifold supplying the hoses which cool the stator.

According to the invention, a simple and effective cooling system is provided wherein accurate control of coolant flow within the individual rings may be achieved and maintained.

Further in accordance with the invention, adjustment of the flow rates within the individual rings may be made during a test, at which time flow through the rings may be "fine tune" for achieving a proper design or specification temperature; this may be determined by instrumentation, such as with an ultrasonic type flow rate meter, or by other form of observatiton during this phase. Thereafter, when the desired coolant flow is achieved in each of the rings, the means controlling coolant flow may be permanantly sealed and locked into position to insure continued performance on a satisfactory basis.

In view of the shortcoming of the prior art, it is an object of the invention to provide an improved coolant flow control system for electrical generators.

Another object of the invention is to provide a method for controlling the flow of liquid among the various individual rings comprising an array parallel rings used to carry electrical current from the stator windings of a generator to the lead bushing of such generator.

Another object of the invention is to provide a flow control system for the parallel rings of an electrical generator wherein one or more of the rings may be drilled and tapped to receive a simple flow control element having an end portion positioned within the coolant passage of the individual parallel ring and retained in such postion by cooperating threadss or like means formed in the ring sidewall.

Another onject of the invention is to provide a methhod of controlling the flow of coolant within parallel rings so that an array of rings may be cause to flow substantially equal amounts of coolant under given conditions, the method including the steps of drilling and tapping the parallel rings in at least one area thereof and inserting threaded fasteners having an end portion extending into the passage, and positioning each element until its associated passage is obstructed sufficiently to gain the desired overall balance of coolant flow in the rings as a group, and thereafter sealing and locking the control element in place, removing any protruding portion which may lie substantially outside the outer surface of the cooling ring sidewall.

A further object is to provide a coolant flow control system using readily available materials and methods so that the system may be assembled and maintained at very low cost.

The foregoing and other objects and advantages of the invention are achieved in pratice by providing a cooling system for an electrical generator which include a coolant supply tank and supply and return lines a coolant distribution manifold and a collection manifold, and a coolant circulating pump, with each parallel ring having an inlet, an outlet and at least one flow control element; the element being adapted for insertion through the sidewalls of each of the parallel'rings, with the flow control used positioned to control flow is the coolant passages forming the interior of the rings. The method includes positioning and thereafter securing the flow control into in a desired position of use to prevent further movement and sealing them against leakage. The invention is also carried into practice by a method which includes the steps of drilling and tapping the parallel rings, inserting and adjusting the flow control units thereafter securing the units as indicated by coolant flow to obtain an overall cooling balance.

The exact manner in which the invention is carried into practice will become more clearly apparent when reference is made to the following detailed description of the preferred embodiment of the invention set forth by way of example, and shown in the accompanying drawings, wherein like reference numbers indicate corresponding parts throughout.

BRIEF DESCRIPTION OF THE DRAWINGS

FIG. 3 is a greatly enlarged vertical sectional view of a portion of one of the parallel rings of the invention, showing the inlet and outlet means for the coolant as well as a flow control unit positioned with respect to the cooling ring;

FIG. 4 is a vertical sectional view, taken along lines 4—4 of FIG. 3 and showing the distribution and collection headers for the coolant which is furnished to the parallel rings, and showing the individual rings with a flow controller in each of the rings; and FIG. 5-11 are vertical sectional views; on an enlarged scale, and partly diagramatic in nature, illustrating the various steps involved in installing and positioning the flow control units of the invention.

DESCRIPTION OF THE PREFERRED EMBODIMENTS OF THE INVENTION

While it will be understood that the invention has applications other than those described in detail, a preferred form of the invention will be sshown wherein the generator includes six parallel rings, and wherein the coolant supplied to an collected from the rings is withdrawn from the same manifold which is used for coolinng the stator windings of the generator, with such coolant being withdrawn from the coolant supply manifold and directed to the coolant collection mainfold after being passed through one more lead bushings.

Figure 1:
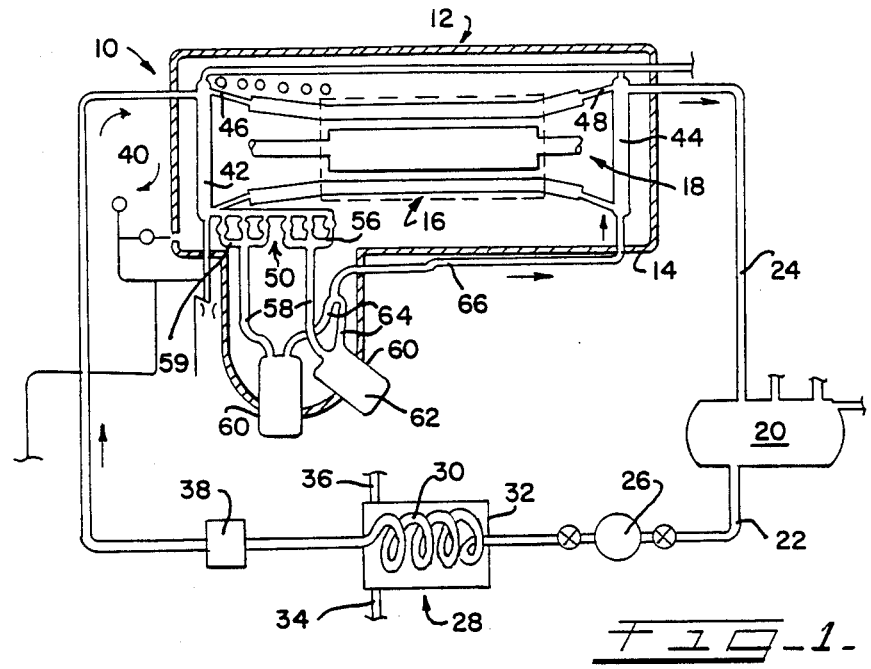
FIG. 1 is a schematic view of an electrical generator showing the water cooling circuit for the parrallel rings, and showing details of the coolant flow and temperature control elements.

Referring now to the drawing in greater detail. FIG. 1, which is schematic in nature, shows the invention to be embodiment in a liquid cooling arrangement generally designated 10 for controlling the temperature rise within an electrical generator assembly generally designated 12 and shown to include an outer housing 14 in which are disposed a stator assembly, shown in phantom lines and generally designated 16, and a rotatable armature unit generally designated 18. The exact constructional details of the generator itself are referred to elswhere herein.

Referring again to FIG. 1, it is shown that the cooling arrangement 10 includes a liquid coolant supply tank 20 to which is attached a coolant supply line 22 and which is fed by coolant return line 24. The cooling arrangement further includes means in the form of a pump 26 for circulating fluid from the coolant supply tank 20 to the portions of the generator to be cooled and back to the tank, as will appear.

The cooling arrangement further includes as is customary, a heat exchanger generally designated 28, and shown to include a coolant coil 30 disposed within a jacket 32 which surrounds the coil 30 and which receives heat exchange fluid from an appropriate supply, such fluid typically passsing through the raw water inlet 34 and out the raw water outlet 36.

The cooling system 10 may further include a filter 38 and one more controls generally designated 40; these controls 40 may be of a temperature responsive or other known type of flow control and/or high temperature detector. The cooling system is further shown to include a supply or coolant inlet manifold 42, and a collection or coolant outlet manifold 44 disposed at the other end of the generator 12. The coolant customarily flows from the supply manifold 42 to the outlet manifold 44 by way of a large plurality of coolant supply hoses 46 which connect the manifold to numerous cooling passages (not shown in detail) lying within the core of the stator 16. The coolant thus passes to the collection manifold 44 by way of coolant return hoses 48. From here, water collected by the manifold 44 passes through the return line 24 to the cool supply tank 20.

Referring now to the novel features of the invention, it will be seen that the generator 12 also includes an array of parallel rings generally designated 50 and lying at one end of the stator 16. For purposes of illustratuion, six such rings are shown in FIG. 1.

In a preferred form of the invention, the preferred means for distributing coolant to the parallel rings comprises a ring coolant supply header 52 having its inlet in communication with a portion of the coolant supply manifold 42. Coolant passes from the header 52 into the interior of the parallel rings 50 through a plurality of stub lines 54. (FIGS. 3, 4). The coolant then passes through the interiors of the individual coolant rings and is collected, in a manner which will be further detailed, in one or more ring coolant collection headers 55, 56.

From the collection headers 55, 56 coolant is supplied by way of transfer lines 58 to water jacket 60 of lead bushing 62. Coolant then passes through lead bushing collection lines 64 which join the parallel ring coolant return line 66 which in turn communicates with the coolant collection manifold 44. The invention is concerned primarily with control of coolant flow in the individual parallel rings as well as within the array of parallel rings as a whole.

Figure 2:
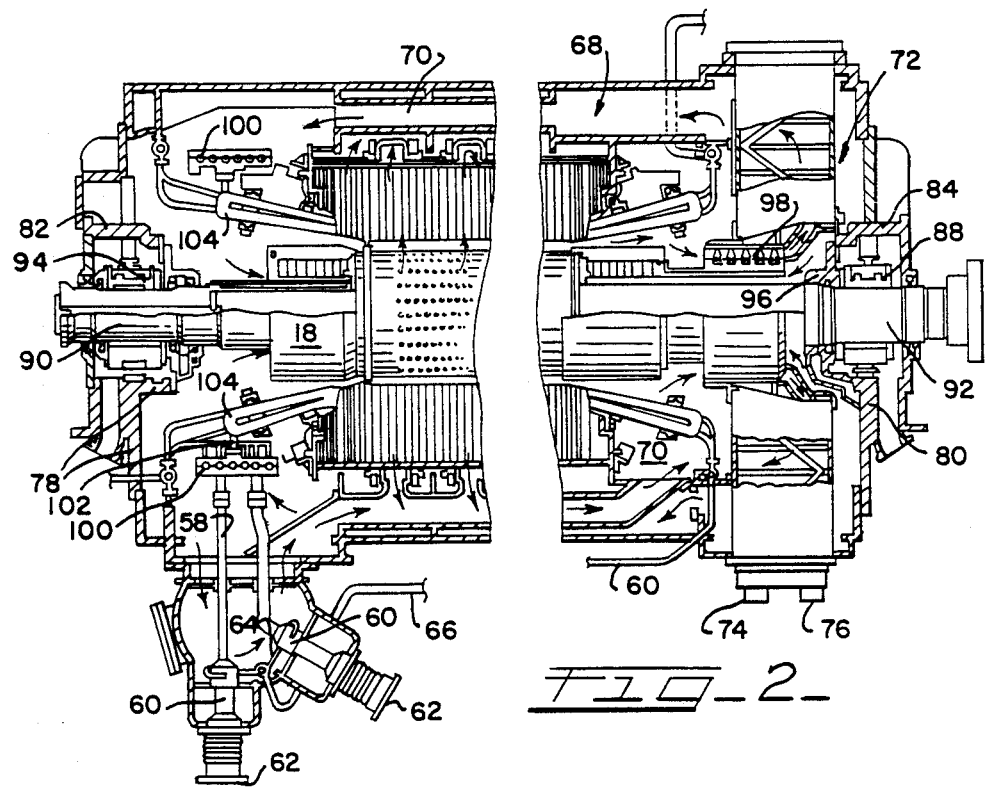
FIG. 2 is a vertical sectional view, with portions broken away, showing the mechanical details of a generator unit which includes the circuitry for the parallel ring coolant which is arranged in accordance with the invention.

Referring now FIG. 2, additional structural details of a typical utility generator having a water cooler stator and parallel rings is shown. Here additional features of construction, which are not per se a part of the invention, are illustrated to provide additional background for the invention.

Referring now to FIG. 2, the generator is there shown to include an exterior shroud generally designated 68, subdivided so as to contain plural cooling gas passages 70 in communication with hydrogen-to-air heat exchanger generally designated 72 and in turn shown to include an inlet pipe 74 and an outlet pipe 76 for cooling air.

In the form shown, the generator is one with a composite cooling system which includes a hydrogen gas cooling system for the armature and certain parts of the stator, and which also includes the pair of liquid cooling circuits referred to above, namely, one circuit for the stator and winding and the other circuit for the parllel rings. The principal elements of the generator include left and right hand end frames 78, 80 each having carrier units 82, 84 for bearing assemblies 86, 88 which journal the shaft end portions 90, 92 of the armature 18. Appropriate seals generally designated 94, 96 prevent leakage of libricant and gaseous hydrogen respectively to the inside and outside of the shroud 68. Impeller vanes generally designated 98 ensure continuous circulation of the hydrogen through the air-to-hydrogen heat exchanger 72 along the path depicted by the arrows in FIG. 2.

FIG. 2 also shows that the parallel rings 50 are positioned by carriers 100 in such a way that the rings 50 lie in a cylindrical array just outside one axial end of the stator 16, and in coaxial relation to the stator 16 and the armature 18. The expression "parallel rings" is customarily applied to current-carrying rings of this function and arrangement. Electrical continuity is provided between the end portions 102 of each of the individual windings 104 which lie in slots (not numbered) in the stator assembly 16. FIG. 2 also shows that the coolant tRansfer lines 58 extend to the jackets 60 surrounding the lead bushings 62; the electrical connection to the lead bushings 62 from the parallel rings 50 may be coaxial with the transfer lines 58. FIG. 2 further shows portions of the liquid coolant lead bushing collection lines 64 which direct coolant to the collection manifold 44 and ultimately to the return line 24.

The coolant supply header 52 is shown to extend outwardly from a part of the manifold 42 and to lie just above the lowermost portion of the parallel rings 50. The ring coolant collection header 56 lies therebeneath.

Preferably, the parallel ring cooling system is incorporated into the same cooling system which supplies coolant to the stator; however, the distribution of coolant both to and within the parallel rings is controlled so as to insure proper individual and collective flow, as will now be described.

Referring now to FIGS. 3 and 4, there is shown an illustration of a part of a particular ring generally designated 106 positioned by a schematically shown holder 100 (FIG. 2). The ring 106 includes the stub line 54 extending from the ring coolant supply header 52. Here, the liquid flows from the header 52 through the stub line 54 and into an interior passage 108 formed within the parallel ring 106; the passage 108 is defined by a continuous, relatively thick exterior sidewall 110. After flowing in the direction shown by the arrows, and traversing the entire extent of the particular parallel ring 106, coolant passes into stub line forming a part of the collection header 56, for example.

According to the invention, flow control means generally designated 112 are provided for insertion into the interior passage 108 of each of the rings 50. Referring to FIG. 3, it will be noted that the flow controller 112 extends through the sidewall 110 and a given distance into the interior passage 108 of the ring 106. This distance is determined experimentally when the generator is constructed and operated, or repaired and/or rebuilt.

According to the invention, each of the rings is provided with its own flow control unit 112 in the manner illustrated in FIG. 4. Here, each flow controller 112 is shown to extend into the interior to a different extent. For this purpose, the controller may include a slot 140 (FIG. 8) for engagement by a screwdriver.

A drill bit 136 is shown forming an opening 138 in the sidewall 110 of a particular parallel ring 106. In FIG. 6, the bit 136 has finished piercing the sidewall to create the opening therein and has withdrawn.. The opening 138 is preferably a signficant percentage, such as at least one-fourth of the diameter of the tube interior passage 108. After the drill 136 is withdrawn, the opening 138 thus formed is topped using a conventional tap 128 (FIG. 7). Thereafter, the flow controller generally designated 112 is threadedly inserted in position in the sidewall 110 (FIG. 8).

Consequently, the flow restriction or control can be achieved in each of the individual rings, as well as within the array as a whole. In FIG. 4, the individual rings are numbered 106 and 114; 116, 118, 120 and 122; rings 106, 114 and 116 are associated with collection header 55 by way of stub lines 124, 126 and 128, while stub lines 130, 132 and 134 are associated with the collection header 56.

Referring now to FIG. 5-11, the method of installing and adjusting a typical flow control 112 is shown. First, FIG. 9 shows that and end portion 142 of the flow controller 112 extends signficantly into the passage 108. Assuming for the momnent that the position shown is the desired position of this flow controller 112, whose function is to impede flow of water within the parallel ring 106, the controller 112 is locked and sealed in position, as by flowing a bead of solder 144 along the cooperating threaded surfaces 146 on the controller 112 and on the sidewall 110. If a measurable portion of the controrller 112 extends above the outer surface of the ring 102, the outer end 148 may be cut away and discarded (FIG. 11) so that the remaining end portion 150 is substantially flush with the outer diameter 152 of the cooling ring.

Referring now to FIGS. 3 and 4 on the one hand and FIGS. 5-11 on the other hand, it will be appreciated that the flow controllers are depicted as entering the passage from the bottom in the lower numbered figures, and from the top in the higher numbered figures. This is done merely from convenience in illustration, it being understood that a particular angular aligment of the control elements is nencessary to achieve the purposes of the invention. The portions of the parallel rings which are drilled and tapped for insertion of the controllers depends on the overall construction of the generator and the situation of the parallel rings. The insertion of this flow controller may be made wherever axis is easiest.

While not shown in detail, it is understood by those skilled in the art that by appropriately instrumenting the parallel rings themselves or the flow of water emerging from them, a proper balance of coolant flow in the parallel rings may be achieved. The amount of coolant flow through the array of parallel rings as a whole may be varied, as well as proportionate flow through the individual parallel rings themselves, depending upon the particular adjustment afforded to each ring. In the illustrated embodiment, one flow control is shown as being used in each ring, and this element is shown positioned near the point at which the stub line of the supply header join the ring; however, it will be understood that the flow controller may be inserted into the ring at any point, and that two or more controllers may be used for each ring of this should prove desirable. Of course, it may be that only one or two controllers would need to be inserted; in most cases, the ring or rings' with lower flow rates need not have a controller inserted, and the flow in the other rings may be decreased, both to match the flow rates and to increase flow in the less restricted lines.

An important advantage of the present invention is that the flow control system described may be retrofitted to existing generators or may be supplied as a portion of the coolant control system for newly manufactured units. Experience in the field has shown that whereas coolant flow might be relatively equal among parallel rings when a unit is first manufactured and installed, the flow rates in the individual rings may degenerate for one reason or another and the present invention provides an easy means of adjusting the flow rate to conditions existing at the time adjustment is necassary.

The flow rates and actual temperature of the coolant may be measured from time to time and further adjustment may be made as indicated by removing and replacing the flow control units or simply melting the sealing and locking solder, then readjusting and sealing the control elements as necessary.

The advantages of the present invention may be achieved without resort to highly skilled labor and the cost is minimal. Needless to say, damage or destruction of a generator involves exceptionally great expenses, and even where there is a failure which may be repaired at moderate cost, the expense and inconvenience of downtime is very signficant. The present invention provides a simple and economical way of ensuring long term, continually satisfactory cooling performance from large generators including electrical utility or like generators.

It will thus be seen that the present invention provides a novel cooling arrangement having a number of advantages and characteristics including those herein before pointed out and others which are inherent in the invention. It is anticpated that modifications and changes may occur to those skilled in the art and that such changes and modifications may be made to the form of the invention shown without departing from the spirit of the invention or the scope of the appened claims.

I claim:

1. A cooling arrangement for an electrical generator which includes a stator, a cylindrical opening extending therethrough, an armature received in coaxially aligned relation with said stator and mounted for rotation within said stator, said stator including a plurality of individual electrical windings each having portions disposed in slots extrending axially of said stator, a plurality of current-carrying rings arranged in parallel relation to one another so as to form a cylindrical array of said rings, said array being disposed at one end of said stator and aligned coaxially therewith such that said rings extend circumferentially of said stator opening, each of said rings being in electrically conductive relation with an associated electrical winding, each of said parallel rings being of tubular construction and having a continuous ring sidewall portion defining an interior liquid passage, each of said rings also having a liquid coolant inlet and a liquid coolant outlet, means for distributing coolant from a coolant source to each of said ring inlets, means for collecting coolant from each of said coolant outlets for return to said coolant source, and means for circulating said coolant from said coolant source to said ring inlets, through said rings, and from said ring outlets back to said coolant source, at least one of said rings having at least one means for adjustably controlling the flow of said coolant within said passage, said flow control means including an end portion positionable within said interior liquid passage, cooperating means on said ring sidewall portion and said flow control means for positioning said end portion relative to said liquid passage, and means for securing said cooperating means on said ring sidewall and said flow contrrol means against coolant leakage and movement relative to said ring when said end portion of said flow control means has been placed in a desired position of use within said coolant passage.

2. A cooling arrangement as defined in claim 1 in which at least all but one said plurality of said rings includes at least one of said flow control means.

3. A cooling arrangement as defined in claim 1 wherein each of said rings includes at least one said means for adjustably controlling coolant flow.

4. A cooling arrangement as defined in claim 1 wherein said means for distributing coolant comprises at least one coolant header having its inlet in communication with a coolant supply manifold forming a part of said cooling arrangement.

5. A cooling arrangement as defined in claim 1 which further includes a coolant supply manifold having one portion thereof connected to said coolant source and another end connected to a coolant collector manifold, said supply manifold being in fluid communication with a plurality of coolant hoses, each associated with a portion of said stator, said cooling arrangement further including a coolant supply header and a coolant collection header, said supply header having a plurality of lines each extending from said suppy header to an associated ring inlet and said collection header having coolant lines extending to it from an associated ring.

6. A cooling system for the parallel conductor rings of an electrical generator, said system comprising, in combination, a coolant supply tank, a coolant supply line, a coolant return line, a plurality of parallel conductor rings for conducting current generated in the stator windings of an electrical generator, each of said conductor rings having each of said rings having continuous ring sidewall portion a coolant inlet passage and a coolant outlet passage, and a interior liquid coolant passage extending between and joining said inlet passage to said outlet passage, means for circulating coolant to and from said coolant supply tank; means in communication with said supply line for distributing coolant from said coolant supply line to said parallel ring inlet passages and for collecting said coolant from said parallel ring outlet passages, at least one of said conductor rings having coolant flow control means operatively associated therewith, each of said coolant flow control means comprising flow control elements including an end portion positionable within said interior liquid coolant passage, cooperating means on said ring sidewall portion and said flow control means for positioning said end portion relative to said liquid passage, and means for securing said cooperating means on said ring sidewall portion and said flow control means against coolant leakage and against movement relative to said ring when said end portion has been placed in desired position of use within said liquid coolant passage.

* * * * *